Patented July 24, 1934

1,967,222

UNITED STATES PATENT OFFICE 1,967,222

GRANULATION OF FINELY DIVIDED MATERIALS

Herrick Ransom Arnold, Elmhurst, Del., assignor to E. I. du Pont de Nemours & Company, Wilmington, Del., a corporation of Delaware No Drawing. Application August 15, 1931, Serial No. 557,425

16 Claims. (Cl. 23—233)

This invention relates to the art of granulating finely divided materials, and more particularly to the granulation of such materials, as a step in the process of preparing catalysts, or catalyst supports. The invention also embraces the materials, catalysts, and catalyst supports so prepared.

In the art of transforming finely divided materials such as inorganic powders or dusts into granular particles, the process of mixing them to a paste or dough with water or other liquid, with subsequent drying and sizing, is not new. Arsenic dust has been granulated by such a process, and finely divided catalytic materials have been formed into hard granules and used as such, or pressed into tablets.

Various binding agents have been incorporated in the substances to be granulated, in order to improve the product, but in general all granulation methods follow the fundamental process outlined above.

This invention has as an object to provide an improved method for granulating finely divided materials whereby said materials may be prepared in a granular state having the highest degree of hardness and uniformity, with the minimum of fines or dust and having good briquetting characteristics. A further object is to provide such a process for the granulation of finely divided catalytic materials in order to provide the optimum granular condition for pressing into tablets, or for use in such granular form without briquetting. Other objects will appear hereinafter.

These objects are accomplished by the following invention which, in its general aspects, comprises the intimate mixing of a finely divided material with water or other volatile liquid, in a suitable mixing machine until the material reaches a point at which it changes its state of aggregation very rapidly from that of an apparently dry powder to small round moist lumps of at least one millimeter diameter. This material is then dried and used in this granular state, or pressed into tablets by means of any of the well known, standard machines now on the market, such as hydraulic presses, pharmaceutical tablet machines, etc.

The following examples of my invention are included for the purpose of illustration but are not to be regarded as limitations.

Example 1

Zinc chromite was prepared by mixing solutions containing zinc nitrate and ammonium chromate in the cold. The precipitated basic zinc chromate is heated to a termperature of about 400° C. when the basic salt decomposes spontaneously to yield zinc chromite. Two hundred grams of the finely divided zinc chromite catalyst, capable of being passed through a 60-mesh screen, was mixed in a small laboratory mixer equipped with sigma-shaped blades. During mixing, 100 cc. of water at 85° C., which contained four grams of ammonium dihydrogen phosphate in solution, was added slowly during a period of 20 minutes. After all the water was added, mixing was continued for 35 minutes during which time the material had the appearance of fine, dry powder. At the end of this time, however, the material began to change rapidly from a smoothly flowing, fine powder to tiny moist granules which increased rapidly in size until the mass had acquired the appearance and consistency of so-called "cottage cheese". At this point the mixing was stopped, and the material dried at 110° C. After drying, the small granules were found to be quite hard, free from dust and fines, and in ideal condition for briquetting, being readily formed into briquettes without the addition of a wetting or binding medium.

The catalyst prepared as described in this example possessed great catalytic efficiency, and when pressed into the form of tablets showed remarkably good durability, being capable of use under severe conditions and for long periods of time without disintegration.

This granular material was pressed into three-sixteenths inch tablets, one-fourth inch long, and used for the dehydrogenation of ethyl alcohol under pressure. At 385° C. and 200 atm. pressure, passing the alcohol over the catalyst at the rate of 16 cc. per cc. of catalyst per hour, a 15% conversion of alcohol to ethyl acetate resulted during 40 hours, with no indication of weakening of the catalyst tablets.

By way of showing the advantage gained in mixing finely divided materials in the manner described above, the conditions of Example 1 were duplicated exactly, except that mixing was not stopped at the granular cheesy stage, but was continued until the mass had attained the condition of large, wet, dough-like lumps. On drying this material at 110° C., it was found to be no longer hard and granular, but crushed very easily into soft, fine powder, similar in every respect to the original material, and incapable of being briquetted satisfactorily.

This granular material after being briquetted was used for the dehydrogenation of ethyl alcohol under the conditions described above, giving the same conversion, but with the result that during the process the catalyst disintegrated badly owing to the softness of the catalyst.

Example 2

One hundred grams of basic aluminum sulfate (30-mesh powder) was mixed with 80 cc. of water added slowly over a period of three hours, after which the material still appeared fairly soft and dry. After continuing the mixing for 15 minutes longer without further addition of water, the material suddenly changed to the granular cheesy state described in Example 1.

After drying this material at 110° C. and screening it through a 10-mesh screen, a very clean, hard, granular product was obtained containing less than 5% of fines and capable of being briquetted to form dense, coherent masses.

This material was easily briquetted without the addition of a wetting or binding medium in hard tablets, quite resistant to erosion by liquids and gases or to sudden changes of temperature and pressure, such as were encountered in its use as a catalyst for various organic reactions.

Example 3

Sixty-seven cc. of cold water was added slowly during mixing, to 400 grams of white seal zinc oxide powder. After mixing for 45 minutes the oxide suddenly changed in less than one minute from an apparently dry, soft powder to damp, discrete granules of about 6 mesh size. After drying at 110° C., these granules were very hard and uniform and contained practically no fines.

The material so treated may be readily briquetted similarly to the materials prepared according to Examples 1 and 2, to very hard, resistant, tablets of a strength sufficient to withstand the rigorous liquid or gaseous erosion, and extremes of temperature and pressure encountered in its use as a catalyst for various catalytic reactions.

Example 4

One hundred and fifty grams of chromic oxide were mixed slowly with 100 cc. of cold water. After addition of the water, mixing was continued for about 45 minutes at the end of which time the material underwent the same rapid change of physical form described in the proceding examples, resulting in a granular product which after drying at 110° C. was quite hard and uniform in size, and which had similar durability and briquetting characteristics described for the materials of the preceding examples.

Example 5

Two hundred grams of a commercial kieselguhr product known as Filter Cel was mixed slowly with 150 cc. of water, the mixing being continued, after all the water was added, for a period of 45 minutes. At the end of this period the mixture changed rapidly from a fine moist powder to small, round wet balls of about 6 mesh size. After drying at 110° C. the granular material was sufficiently hard and free from fine powder to be pressed into fairly hard tablets with little difficulty. This material so granulated may be used as a support for a wide variety of catalytically active materials.

It will be evident from the above examples that the fundamental feature of this invention consists in mixing a finely divided material with water or other suitable volatile liquid to produce a certain definite physical form which has been described as closely resembling a slightly moist, granular "cottage cheese". The attainment of this particular state is readily identifiable by the sudden change in appearance which takes place at a certain point in the mixing. If the mixing is stopped short of, or carried much beyond this state, an inferior product is obtained. The granular materials so prepared, in addition to having valuable applications in the industries in the form of discrete granules, possess the property of being easily briquetted to form dense, strong, self-sustaining, durable masses of particular utility when used as catalysts in high temperature and high pressure catalytic processes. Such briquetting may be readily accomplished without the necessity of wetting the dried granules by molding under pressure using a hydraulic press or a pharmaceutical tableting machine. No binding agent is necessary to produce briquets or tablets having great coherence and durability, although a small amount of binding material may be added to the material to be granulated, if desired either before or after the formation of the grains, thus in Example 1, ammonium dihydrogen phosphate was contained in the water which was added to the powdered zinc chromate at the beginning of the granulation process.

The size of granules finally obtained depends to a considerable extent upon the regulation of the size of the lumps formed during the cheesy stage of the mixing. For example, with a given material the lumps may attain a size of approximately one millimeter at the beginning of the critical transition period. If the mixing is continued for 2-5 minutes the lumps may attain a size of 3-5 millimeters. It will thus be seen that the granule size of the finished product may be varied within certain limits, but it is to be again noted that the mixing period must not be carried beyond the cheesy stage for otherwise the material again becomes moist and renders uniform granulation impossible.

Although it is well known that mixing finely divided materials with water is a step in the granulation process, thus far no one has recognized the critical transition period which occurs during the mixing of practically all such materials with water or other volatile liquid medium, nor recognized that it is the condition of the material during this critical period which results in the desired optimum granulation of the finished product.

It has been found that the ratio of water to solid materials necessary to produce the best product varies with the solid material used. In general, it may be said that the water required should not be greater than 80% or less than 10% of the weight of solid material, the preferred amount in most cases being about 50%. For optimum results in producing a firm hard briquette the amount of water or other wetting medium is around 50% for materials of medium density and fineness. For similar results with other materials the proportion of liquid medium is decreased when using materials of higher density and is increased for materials of lower density, also for materials which are more finely divided or of which the individual particles are porous or capable of absorbing more or less of the liquid medium.

In practice it is not difficult by a simple test to determine for a given material the proportion of water required to obtain a given desired result. The material to be granulated is agitated in a mixer and the water is gradually added until the charge is in condition to reach the transition stage as the result of a reasonable period of additional mixing, but the addition of water is stopped while the material is still not visibly moist and preferably while the charge still requires several minutes additional mixing to reach the transition stage.

A suitable test which may be applied to any material in order to determine the proper ratio of liquid medium to solid material is the well known Standard Rub-Out Test for oil absorption of paint pigments. Briefly this test is made by adding the liquid drop by drop to a one gram sample or any multiple thereof of the powder to be granulated on a porcelain plate. After the addition of each drop the liquid is thoroughly incorporated by mixing with a spatula. The ratio of liquid to solids is approximated when the liquid-solid mixture has reached a very stiff putty-like paste which does not break or separate.

Although I have mentioned herein only a few of the materials which can be granulated by this method, it should be understood that the method is applicable to the granulation of any material, whether organic or inorganic, which is insoluble or only slightly soluble in the liquid medium used.

Although water is the preferred medium for granulation, other volatile liquids not incompatible with the material treated may be used without departing from the spirit and scope of this invention. For instance, methyl or ethyl alcohol may be used in many cases with practically the same effect.

The mixing apparatus used for this process need not be limited to any particular type, although the well known type of mixer which employs sigma-shaped or helical blades capable of giving a certain amount of kneading and cutting action is preferred. The speed of the mixing blade should not exceed 100 R. P. M., since too rapid mixing may cause the attainment of the critical granulation state so rapidly as to escape observation, and cause the disintegration of the agglomerated particle. A suitable and preferred mixing speed is about 50-60 R. P. M.

This process may be employed in combination with the incorporation in the mass of any binding or lubricating material or other material added for any reason whatever, the granulation process being in large degree independent of such steps and producing an entirely satisfactory granular product without the aid of other materials or treatment.

This process may be carried out under elevated pressures or temperatures, if so desired, although in most cases the ordinary pressure and temperature is sufficient.

This process may be used in the preparation of pharmaceutical chemicals in granular or tablet form, or in any case where a fine powder or dust is undesirable.

The granulated material produced according to the present process may be pressed in ordinary briquetting or tableting machines such as the pharmaceutical tablet machine in which the granules are fed continuously into a series of dies and compressed between closely fitting punches.

An important use of this process occurs in the preparation of catalytic materials or catalyst supports in granular or tablet form where said materials are required to withstand severe conditions of temperature, pressure and erosion due to gas velocity. Such materials are preferably in granular or tablet form in order to allow the free passage of gases or vapors. My invention provides a convenient and efficient method of producing this condition. The process is applicable to the treatment of mixed catalysts; thus Example 1 could be applied to the granulation of mixed pulverized chromites, as well as of a single chromite. Any other pulverized mixture capable of being wetted but not dissolved in water or other volatile liquids, and kneaded into plastic masses is capable of treatment in accordance with the teachings of the invention.

The most important advantage of this invention lies in the fact that the material, prepared according to the procedure described, results in a granular product which has the optimum conditions of hardness, uniformity, and freedom from fines or dust. The product is therefore an improvement over material which has been granulated by mixing with water or other volatile liquid in the usual method but carried out without recognizing the significance of the well-defined transition state defined above.

The terms "granular substance" or "granular state" as used in this specification are intended to define that state of a substance in which the individual grains have a diameter of one millimeter or greater. These terms are intended to embrace aggregate or composite grains and are not intended to cover substances of powdery, dust-like or gritty condition, and do not cover substances in the condition of powder or dust, or in sand-like condition.

As many apparent and widely different embodiments of this invention may be made without departing from the spirit thereof, it is to be understood that I do not limit myself to the foregoing examples or description except as indicated in the following claims.

I claim:

1. The process of granulating finely divided materials which comprises adding to a finely divided material from 10% to 80% of its weight of a volatile liquid medium in which said material is substantially insoluble, continuing the mixing to obtain an intimate and substantially uniform distribution of the liquid thruout said material, further continuing said mixing until the material starts to form moist granular aggregates having substantially the consistency of cottage cheese, interrupting the mixing at this point, and thereafter drying said material.

2. The process of claim 1 characterized in that the liquid medium is water.

3. The process of claim 1 characterized in that the liquid medium is water and the mixing is discontinued when the granular aggregates are substantially of 1-5 mm. in diameter.

4. The process of claim 1 characterized in that the liquid medium is water and the mixing is discontinued when the granular aggregates are substantially of 1-5 mm. in diameter, said process being further characterized in that the finely divided material is an inorganic material.

5. The process of treating a finely divided catalytic material which comprises adding to said material from 10% to 80% of its weight of a volatile liquid medium, continuously mixing the mass until the liquid medium is intimately and substantially uniformly distributed thruout said material, further continuing the mixing until said material changes rapidly from a powder to a mass of moist granular aggregates having the consistency of cottage cheese, interrupting the mixing at this point to obtain the same in the form of dense, rugged, discrete grains, and drying the material.

6. The process of claim 5 characterized in that the liquid medium is water.

7. The process of treating a pulverized chromite catalyst material which comprises adding to said material from 10% to 80% of its weight of water, continuously mixing the mass until the water is intimately and substantially uniformly distributed thruout said material, further continuing the mixing until said material changes rapidly from a powder to a mass of moist granular aggregates having the consistency of cottage cheese, interrupting the mixing at this point to obtain the same in the form of dense, rugged, discrete grains, and drying the material.

8. The process of claim 7 characterized in that the chromite catalyst is zinc chromite.

9. The process of claim 7 characterized in that the chromite is zinc chromite and the water is present in an amount of about 50% of the weight of the zinc chromite.

10. Rugged granular catalytic material prepared by adding to a finely divided catalytic material from 7% to 80% of a volatile liquid medium in which said material is substantially insoluble, continuously mixing the mass until the liquid medium is intimately and substantially uniformly distributed thruout said material, further continuing the mixing until said material changes rapidly from a powder to a mass of moist granular aggregates having the consistency of cottage cheese, interrupting the mixing at this point, then drying the material to remove the liquid medium therefrom.

11. The process of claim 10 characterized in that the volatile liquid medium is water.

12. The process of claim 10 characterized in that the finely divided catalytic material is a chromite catalyst.

13. The process of claim 10 characterized in that the finely divided catalytic material is zinc chromite.

14. The process of treating a finely divided inorganic material which comprises adding slowly to the said material from 10% to 80% of its weight of water, with mixing, further continuously mixing the mass after the addition of all of the water for a period of from 15 to 45 minutes until the mass suddenly changes to the consistency of cottage cheese, stopping the mixing at this point, then drying the mass.

15. The process of claim 14 characterized in that the finely divided inorganic material is a catalytic material.

16. The process of claim 14 characterized in that the finely divided inorganic material is a catalytic material and the dried granular material is briquetted.

HERRICK R. ARNOLD.